July 6, 1937.  W. FAAS  2,086,315

CAMERA

Filed Nov. 2, 1935

Inventor
Walter Faas
By C. A. Snow & Co.
Attorneys.

Patented July 6, 1937

2,086,315

UNITED STATES PATENT OFFICE 2,086,315

CAMERA

Walter Faas, San Diego, Calif.

Application November 2, 1935, Serial No. 48,026

1 Claim. (Cl. 95—31)

This invention aims to provide a small, compact, simply made and inexpensive vest pocket camera so constructed that a long film may be used, thereby enabling the operator to take a large number of pictures without changing the film, no paper backing for the film being required, and it being possible to open the camera at any time, cut off the exposed portions of the film and use the balance of the film, no portion of the film being wasted. The invention aims, moreover, to supply a camera of the type described in which no film spools are required.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
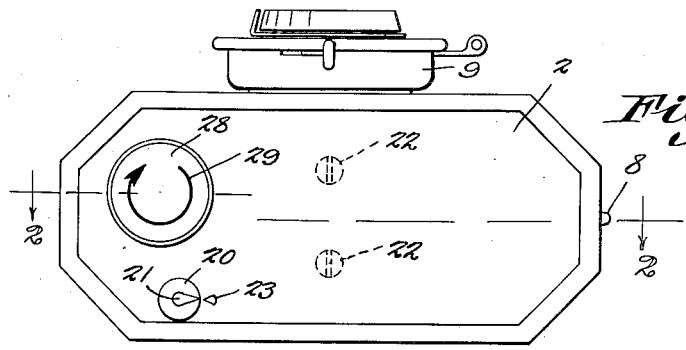
Fig. 1 shows, in bottom plan, a camera constructed in accordance with the invention.

The camera forming the subject matter of this application comprises an elongated box-like body 1, the exact shape of which may be changed without departing from the spirit of the invention. The body 1 includes a fixed bottom 2. The body 1 is surmounted by a removable lid 3 having a depending flange 4 extended around the body. At one end of the body 1 there is a stud 5, adapted to be received in an opening in the flange 4. A spring latch 6 is secured at its lower end to the opposite end of the body 1, within the body, the latch 6 being supplied at its upper end with a finger 7, slidable in an opening in the end of the body 1, and adapted to enter an opening in the flange 4 of the lid 3, the lid thus being held securely but removably upon the body 1. An operating button 8 is secured to the latch 6 and slides in the end of the body 1, it being possible to push in the button 8, retract the finger 7 out of engagement with the flange 4 of the lid 3, and take off the lid.

The front wall of the body 1 carries a lens and shutter mechanism 9 of any desired construction. A finder 10 is hinged at 11 to the lid 3 and may be folded backwardly upon the lid when there is no occasion to have the finder in the vertical position of Fig. 3. The finder 10 constrains the operator to hold the body 1 in such position that the lid is uppermost during picture-taking.

A light tube 12 is attached by securing elements 23, such as screws, to the bottom 2 of the body 1 and is disposed about the neck 30 of the lens and shutter mechanism 9. The light tube 12 extends backwardly to the rear wall of the body 1, but is spaced from the rear wall by a distance closely approximating the thickness of the film 31. A frame 14, having an opening 16, is secured to the rear end of the light tube 12 and forms part thereof, the edges of the frame 14 being rounded or convexed, as shown at 15, to prevent marring of the film, as the film passes between the frame and the rear wall of the body 1. The light tube extends between the bottom 2 of the body and the lid 3, and forms, at one end of the body, an unincumbered first chamber 17. By "unincumbered" it is meant that there is nothing in the chamber 17 for the mounting of the usual spool that forms the core of a commercial photographic film. The light tube 12 forms, in the opposite end of the body 1, a second compartment 18, in which is located the mechanism for advancing the film.

Figures 2, 3:
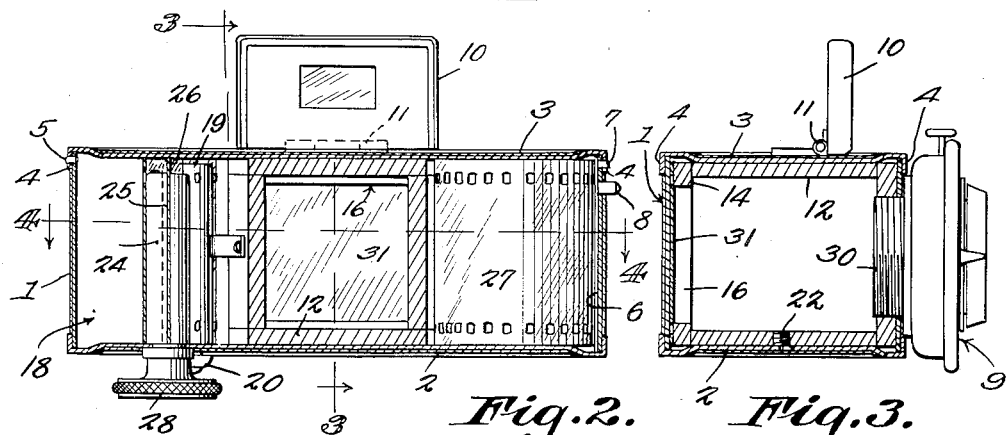
Fig. 2 is a section on the line 2—2 of Fig. 1.
Fig. 3 is a section on the line 3—3 of Fig. 2.
Figure 4:
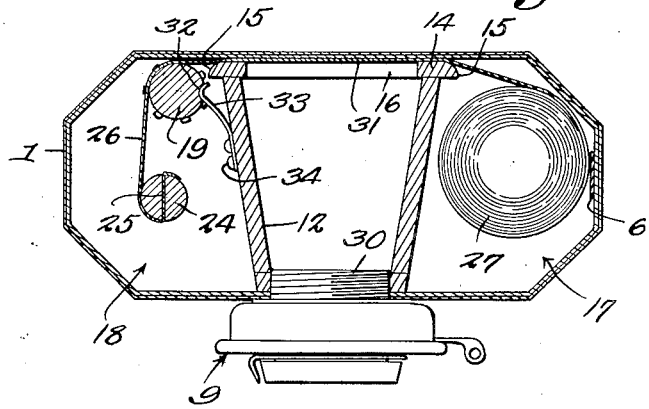
Fig. 4 is a section on the line 4—4 of Fig. 2.

The mechanism last above referred to embodies a winding roller 24, held for rotation in the bottom 2 of the body 1, as clearly shown in Fig. 2. The winding roller 24 has a slot 25 for the reception of one end 26 of the film 31, the unexposed portion of the film being in the form of a roll 27, located in the chamber 17. There is no occasion for providing a core or spool for the roll 27, since the tendency of the roll is to keep, with sufficient closeness, the form depicted in Fig. 4 of the drawing. The winding roller 24 makes it unnecessary to supply a receiving spool for the exposed portion of the film. The winding roller 24 is provided with a turning button 28, disposed below the fixed bottom 2 of the body 1 and provided with any suitable marking, such as an arrow 29, indicating the direction in which the roller 24 is to be turned.

From the roll 27, the film 31 passes between the frame 14 and the rear wall of the body 1 to the winding roller 24. As the film leaves the frame 14, it passes over a direction changing roller 19, disposed in the second compartment 18, near the rear end of the light tube 12 and supported for rotation in the bottom 2 of the body 1, in the way shown in connection with the winding roller 24 in Fig. 2 of the drawing. The direction changing roller 19 constitutes, also, a part of an indicating mechanism, and with that end in view, the roller 19 is supplied with a head 20, visible below the bottom 2 of the body 1, the head 20 carrying an indicator 21, adapted to cooperate with a mark 23 on the bottom of the body 1. The roller 19 is provided with a seat 32 adapted to receive the curved end of a friction brake 33, secured at 34 to one side wall of the light tube 12.

The operation of the device will be understood readily from what has been stated hereinbefore. By means of the turning button 28, the roller 24 is rotated, and the film is wound upon the roller. The passage of the film to the roller 24 is facilitated by the roller 19 and, furthermore, since rotation is imparted to the roller 19, the indicator 21 on the head 20 of that roller, cooperating with the mark 23, instructs the operator as to the amount that the button 28 should be turned, in order to bring a new portion of the film behind the opening 16 of the light tube 12 and in position to be exposed. The friction brake 33, cooperating with the roller 19, serves to prevent the film 31 from shifting longitudinally to any undesirable extent, after a portion of the film has been positioned to receive the projected image. The circumference of the roller 19 is equal to the width of the opening 16, and each time that the roller 19 makes a complete revolution, the brake 33 will snap into the seat 32 of the roller, thereby admonishing the operator that a new length of film has been brought to the opening 16, for exposure. The part 33, in view of the foregoing, serves not only as a friction brake, but as an audible signal.

It is to be observed that, owing to the provision of the slotted winding roller 24, and since the roll 27 is loose in the compartment 17, no screws are required. A very long film, for instance a motion picture film, may be used, and the operator can take many pictures upon one film. It is a matter of common knowledge that, very often, two or three pictures are taken on a six-exposure film, for instance, and the balance of the film is wasted, because the photographer does not wish to make more pictures than the number specified. With the present invention, the operation may take off the lid 3, sever the exposed portion of the film, thread the end of the balance of the film into the slot 25 of the winding roller 24 and proceed with the making of more pictures, there being no wasting of the film.

The device is simple in construction, but it will be found thoroughly convenient and capable of consummating the objects set forth in the opening portion of this specification, as well as other objects which will suggest themselves to a person skilled in the art.

Having thus described the invention, what is claimed is:

A camera comprising a box-like body, a lens carried by the front wall of the body, a light tube extended backwardly from the lens, a frame on the rear end of the light tube and spaced from the rear wall of the body by the thickness of a film, the light tube defining in one end of the body an unincumbered first compartment in which a loose roll of film may be mounted, and defining a second compartment in the opposite end of the body, a winding shaft journaled in the second compartment, an idle roller journaled in the second compartment behind the winding shaft, a rearwardly extended brake strip secured at one end to the light tube and having a free rear end, the idle roller being provided with a seat receiving the free end of the brake strip, one side of the frame projecting laterally beyond the light tube and toward the idle roller, to prevent a film from being caught between the brake strip and the seat, and the opposite side of the frame projecting laterally beyond the light tube and into the first compartment, and being rounded to guide a film across the back of said frame and into the space between the frame and the rear wall of the body.

WALTER FAAS.